(12) United States Patent
Zhang

(10) Patent No.: US 9,380,767 B2
(45) Date of Patent: Jul. 5, 2016

(54) AQUARIUM WITH A FRESH WATER REPLENISHING SYSTEM

(71) Applicant: ShenZhen Honya Aquarium Equipments Manufacturer Co., Ltd., Guangdong (CN)

(72) Inventor: Xiaojun Zhang, Guizhou Province (CN)

(*) Notice: Subject to any disclaimer, the term of this patent is extended or adjusted under 35 U.S.C. 154(b) by 0 days.

(21) Appl. No.: 14/806,649

(22) Filed: Jul. 23, 2015

(65) Prior Publication Data

US 2016/0128309 A1    May 12, 2016

(30) Foreign Application Priority Data

Nov. 12, 2014   (CN) .......................... 2014 2 0673392

(51) Int. Cl.
*A01K 63/04*    (2006.01)
*A01K 63/00*    (2006.01)

(52) U.S. Cl.
CPC ............. *A01K 63/045* (2013.01); *A01K 63/003* (2013.01); *A01K 63/047* (2013.01)

(58) Field of Classification Search
CPC . A01K 63/045; A01K 63/003; A01K 63/006; A01K 63/04; A01K 63/047; C02F 1/006; C02F 3/06
USPC .......... 210/416.2, 167.21; 119/260, 259, 268, 119/51.04
See application file for complete search history.

(56) References Cited

U.S. PATENT DOCUMENTS

| | | | | |
|---|---|---|---|---|
| 4,156,401 A * | 5/1979 | Ogui | ................... | A01K 63/003 119/259 |
| 4,162,218 A * | 7/1979 | McCormick | ............ | C02F 1/006 137/386 |
| 4,687,575 A * | 8/1987 | Grose | .................. | A01K 63/045 119/260 |
| 5,160,622 A * | 11/1992 | Gunderson | .......... | A01K 63/045 210/167.22 |
| 5,860,393 A * | 1/1999 | Calabrese, Jr. | ......... | A01K 63/04 119/260 |
| 7,736,496 B2 * | 6/2010 | DeGiacomo | ......... | A01K 63/047 119/268 |
| 9,155,288 B1 * | 10/2015 | Ting | ..................... | A01K 63/003 |

* cited by examiner

*Primary Examiner* — Yvonne Abbott-Lewis
(74) *Attorney, Agent, or Firm* — Prakash Nama; Global IP Services, PLLC

(57) ABSTRACT

The present utility model discloses an aquarium with a fresh water replenishing system comprising an upper tank, a connecting cavity, a lower cabinet and a fresh water replenishing system, with the said upper tank fixed on the lower cabinet, and the said connecting cavity fixed at an inner corner of the upper tank. It effectively utilizes space to store a fresh water replenishing box with a small space occupied. It is provided with a salt water and fresh water circulating system, making it easy to keep salt water and fresh water fish. It is provided with a water baffle to reduce water velocity, reducing noise. All components of its upper tank are provided on the same wall and cover this wall, contributing to good visual effects, safety and aesthetics.

4 Claims, 2 Drawing Sheets

AQUARIUM WITH A FRESH WATER REPLENISHING SYSTEM

BACKGROUND OF THE INVENTION

The present utility model relates to an aquarium, especially to an aquarium with a fresh water replenishing system.

There are many kinds of aquariums available on the market currently. Aquariums with a water circulating system are popular. It is generally not a problem to keep fresh fish in aquariums with a water circulating system, but this is a problem for salt water fish because water is always volatilized, the salt content in salt water in aquariums increases continuously with the volatilization of water, and it is increasingly difficult for salt water fish to survive, thus causing fish death. Some aquariums are provided with a fresh water storage box and use a pump to replenish water, which occupies a large space and is not aesthetic and easy to operate.

BRIEF SUMMARY OF THE INVENTION

It is an object of the present utility model to effectively overcome the shortcoming of the above-mentioned technology and provide an aquarium with a fresh water replenishing system that effectively utilizes space to store a fresh water replenishing box, with a small space occupied, aesthetic and easy to keep fresh water and salt water fish.

The technical scheme of the present utility model is as follows: It comprises an upper tank, a connecting cavity and a lower cabinet, with the said upper tank fixed on the lower cabinet, and the said connecting cavity at an inner corner of the upper tank. The improvement is that the said upper tank includes a fresh water replenishing box, a filter plate, an upper water compartment and a lower water compartment, the said filter plate is connected to inside the lower water compartment, and a water outlet is provided on the side of the said upper water compartment; the said connecting cavity includes an upper water chamber, a lower water chamber and a fresh water chamber, the said upper water chamber is connected to inside the upper water compartment, an upper water hole is provided on the said upper water chamber, the said lower water chamber is connected to inside the lower water compartment, a lower water hole is provided on the said lower water chamber, and the said fresh water chamber is connected to inside the fresh water replenishing box, and a water replenishing hole is provided on the said fresh water chamber; a lower tank, an upper pipe, a lower pipe and a water replenishing pipe are provided in the said lower cabinet, an upper pump is provided in the said lower tank, the upper end of the said upper pipe is seamlessly connected to the upper water hole, the lower end of the said upper pipe is seamlessly connected to the pump water outlet of said upper pump, the upper end of the said lower pipe is seamlessly connected to the lower water hole, the lower end of the said lower pipe is located in the lower tank, the upper end of the said water replenishing pipe is seamlessly connected to the water replenishing hole, the lower end of the said water replenishing pipe is located in the lower tank, and a float switch is provided at the lower end of the said water replenishing pipe.

In the above-mentioned structure, a wire compartment is provided in the said upper tank, a wire hole is provided in the said connecting cavity, and the said wire compartment is connected to the wire hole.

In the above-mentioned structure, a water baffle to reduce water velocity is provided in the said lower water compartment.

In the above-mentioned structure, the said fresh water replenishing box is fixed below the filter plate, the said fresh water replenishing box, filter plate, connecting cavity, upper water compartment, wire compartment and lower water compartment are all fixed on the same inner wall of the upper tank, and they are put together to fully cover an inner wall surface of the said upper tank.

The beneficial effects of the present utility model are as follows: It effectively utilizes space to store a fresh water replenishing box with a small space occupied. It is provided with a salt water and fresh water circulating system, making it easy to keep salt water and fresh water fish. It is provided with a water baffle to reduce water velocity and noise. All components of its upper tank are provided on the same wall and cover this wall, contributing to good visual effects, safety and aesthetics.

| | | | |
|---|---|---|---|
| 1. Upper tank | | | |
| 11. Fresh water replenishing box | 12. Filter plate | 13. Lower water compartment | 14. Water baffle |
| 15. Wire compartment | 16. Upper water compartment | 17. Water outlet | |
| 2. Connecting cavity | | | |
| 21. Upper water chamber | 22. Upper water hole | 23. Lower water chamber | 24. Lower water hole |
| 25. Fresh water chamber | 26. Water replenishing hole | 27. Wire hole | |
| 3. Lower cabinet | | | |
| 31. Lower tank | 32. Upper pump | 33. Upper pipe | 34. Lower pipe |
| 35. Water replenishing pipe | 36. Float switch | 37. Pump water outlet | 38. Pump water inlet |

DETAILED DESCRIPTION OF THE INVENTION

The present utility model is further described according to the drawings and illustrations.

Figure 1:
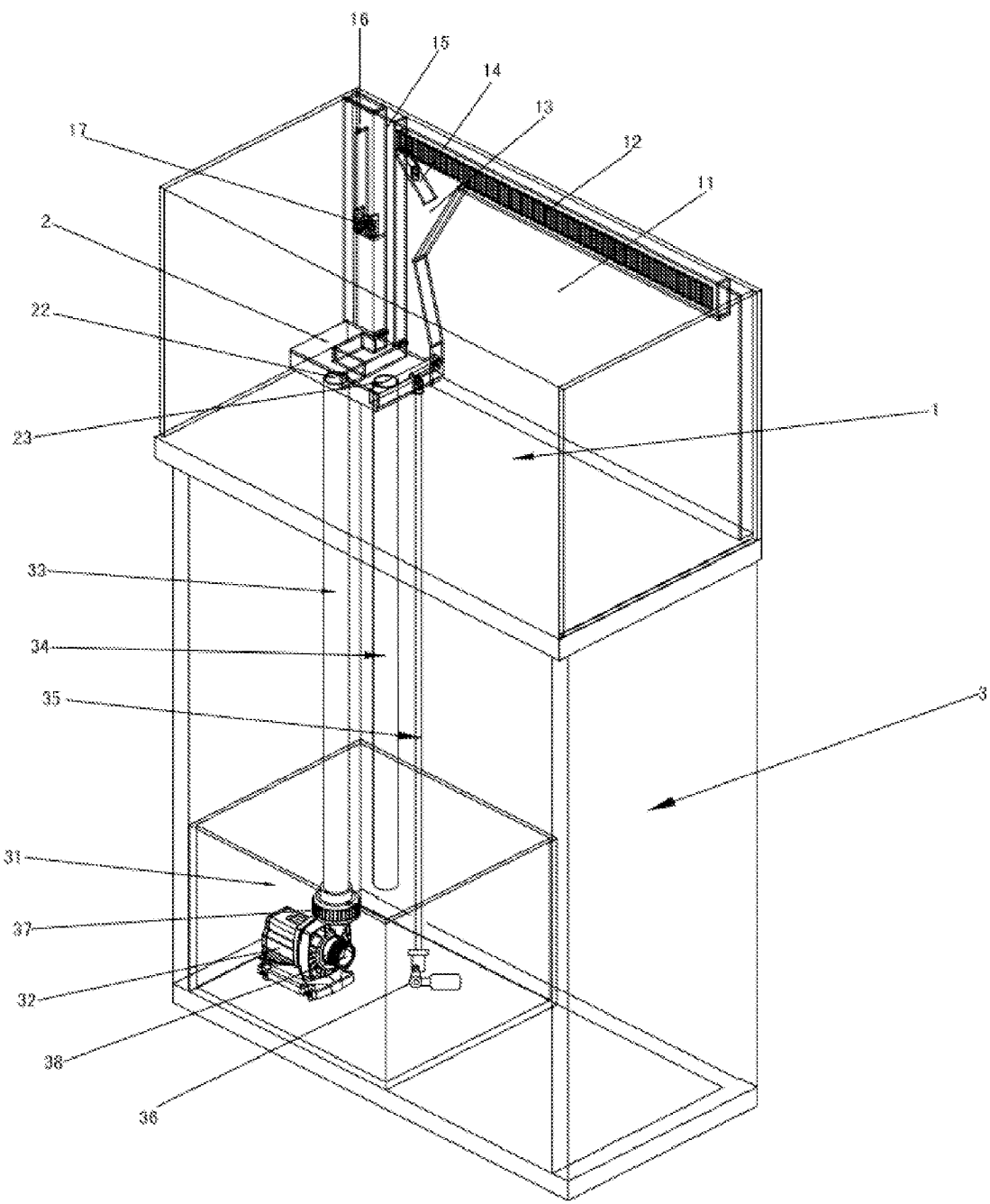
FIG. 1 is a three-dimensional structure drawing of the present utility model.
Figure 2:
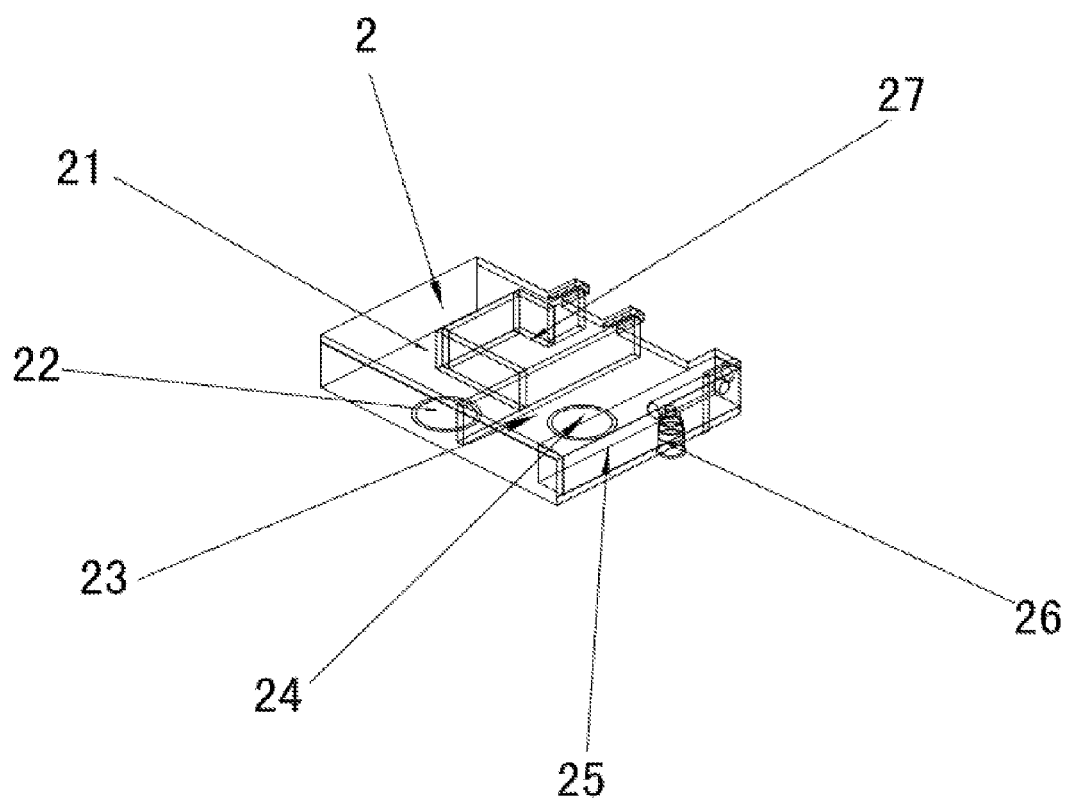
FIG. 2 is a three-dimensional structure drawing of the present utility model.

As shown in FIGS. 1 and 2, the present utility model discloses an aquarium with a fresh water replenishing system comprising an upper tank 1, a connecting cavity 2 and a lower cabinet 3, with the said upper tank 1 fixed on the lower cabinet 3, and the said connecting cavity 2 fixed at an inner corner of the upper tank, wherein the said upper tank 1 includes a fresh water replenishing box 11, a filter plate 12, an upper water compartment 16 and a lower water compartment 13, the said filter plate 12 is connected to inside the lower water compartment 13, the said fresh water replenishing box 11 is fixed below the filter plate 12, a water outlet 17 is provided on the side of the said upper water compartment 16, a water baffle 14 to reduce water velocity is provided in the said lower water compartment 13, a wire compartment 15 is provided in the said upper tank 1, the said fresh water replenishing box 11, filter plate 12, connecting cavity 2, upper water compartment 16, wire compartment 15 and lower water compartment 13 are all fixed on the same inner wall of the upper tank, and they are put together to fully cover an inner wall surface of the said upper tank; the said connecting cavity 2 includes an upper water chamber 21, a lower water chamber 23 and a fresh water chamber 25, the said upper water chamber 21 is connected to inside the upper water compartment 16, an upper water hole 22 is provided on said upper water chamber 21, the said lower water chamber 23 is connected to inside the lower water compartment 13, a lower water hole 24 is provided on the said lower water chamber 23, the said fresh water chamber 25 is connected to inside the fresh water replenishing box 11, a water replenishing hole 26 is provided on the said fresh water chamber 25, a wire hole 27 is provided in the said connecting cavity 2, and the said wire compartment 15 is connected to the wire hole 27; a lower tank 31, an upper pipe 33, a lower pipe 34 and a water replenishing pipe 35 are provided in the said lower cabinet 3, an upper pump 32 is provided in the said lower tank 31, the upper end of the said upper pipe 33 is seamlessly connected to the upper water hole 22, the lower end of the said upper pipe 33 is seamlessly connected to the pump water outlet 37 of the said upper pump 32, the upper end of the said lower pipe 34 is seamlessly connected to the lower water hole 24, the lower end of the said lower pipe 34 is located in the lower tank 31, the upper end of the said water replenishing pipe 35 is seamlessly connected to the water replenishing hole 26, the lower end of the said water replenishing pipe 35 is located in the lower tank 31, and a float switch 36 is provided at the lower end of the said water replenishing pipe 35.

An illustration of the present utility model is as follows: Landscape the present utility model, supply salt water, and keep salt water fish (fresh water and fresh water fish are also feasible). Add fresh water in the fresh water replenishing box (not necessary for fresh fish). Energize the upper pump 32. Salt water in the lower tank 31 enters the upper pump 32 through the pump water inlet 38, flows out of the pump water outlet 37 and into the upper pipe 33, reaches the upper water chamber 21 of the connecting cavity 2, then flows into the upper water compartment and into the upper tank 1 from the water outlet 17. Dirty water in the upper tank 1 is filtered through the sieve plate 12, flows through the lower water compartment 13 and then the lower water chamber 23, and drops into the lower pipe 34 and back to the lower tank 31, thus completing the circulation of salt water. When the water level in the lower tank 31 drops, the float switch 36 in the water replenishing pipe 35 is opened and fresh water in the fresh water replenishing box 11 flows into the lower tank 31. After the water level in the lower tank 31 is normal, the float switch 36 is closed and water flow in the fresh water replenishing box 11 stops, thus completing the replenishment of fresh water.

The present utility model effectively utilizes space to store a fresh water replenishing box 11 with a small space occupied. It is provided with a salt water and fresh water replenishing system, making it easy to keep salt water and fresh water fish. It is provided with a water baffle to reduce water velocity, reducing noise. All components of its upper tank are provided on the same wall and cover this wall, contributing to good visual effects, safety and aesthetics.

The above-mentioned illustration is only a preferred one for the present utility model but not a limitation on the present utility model. Various variations and modifications may appear in the technical thought category of the present utility model. All polishes, modifications or equivalent replacements made by ordinary technicians in this field according to the above-mentioned description are in the protected scope of the present utility model.

What is claimed is:

1. An aquarium with a fresh water replenishing system includes an upper tank, a connecting cavity and a lower cabinet, with the said upper tank fixed on the lower cabinet, and the said connecting cavity fixed at an inner corner of the upper tank, wherein the said upper tank includes a fresh water replenishing box, a filter plate, an upper water compartment and a lower water compartment, the said filter plate is connected to inside the lower water compartment, and a water outlet is provided on the side of the said upper water compartment; the said connecting cavity includes an upper water chamber, a lower water chamber and a fresh water chamber, wherein the said upper water chamber is connected to inside the upper water compartment, an upper water hole is provided on the said upper water chamber, the said lower water chamber is connected to inside the lower water compartment, a lower water hole is provided on the said lower water chamber, and the said fresh water chamber is connected to inside the fresh water replenishing box, and a water replenishing hole is provided on the said fresh water chamber; a lower tank, an upper pipe, a lower pipe and a water replenishing pipe are provided in the said lower cabinet, an upper pump is provided in the said lower tank, the upper end of said upper pipe is seamlessly connected to the upper water hole, the lower end of said upper pipe is seamlessly connected to the pump water outlet of the said upper pump, the upper end of the said lower pipe is seamlessly connected to the lower water hole, the lower end of the said lower pipe is located in the lower tank, the upper end of the said water replenishing pipe is seamlessly connected to the water replenishing hole, the lower end of the said water replenishing pipe is located in the lower tank, and a float switch is provided at the lower end of the said water replenishing pipe.

2. The aquarium with a fresh water replenishing system of claim 1, wherein a wire compartment is provided in the said upper tank, a wire hole is provided in the said connecting cavity, and the said wire compartment is connected to the wire hole.

3. The aquarium with a fresh water replenishing system of claim 1, wherein a water baffle to reduce water velocity is provided in the said lower water compartment.

4. The aquarium with a fresh water replenishing system of claim 2, wherein the said fresh water replenishing box is fixed below the filter plate, the said fresh water replenishing box, filter plate, connecting cavity, upper water compartment, wire compartment and lower water compartment are all fixed on the same inner wall of the upper tank, and they are put together to fully cover an inner wall surface of the said upper tank.

* * * * *